Jan. 6, 1970     HIROTOKI TAKAMUNE ET AL     3,487,629

DRIVE BALANCE WHEEL ARRANGEMENT FOR TIMEPIECE

Filed Feb. 18, 1966     6 Sheets-Sheet 1

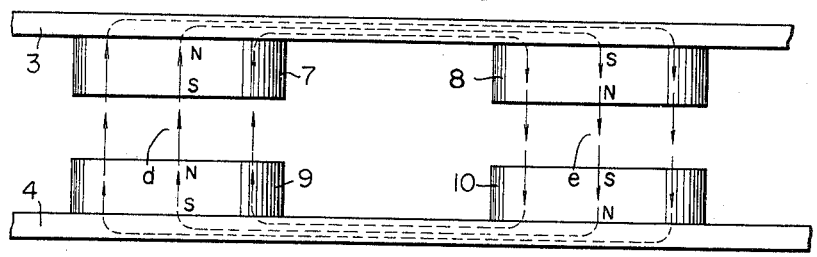
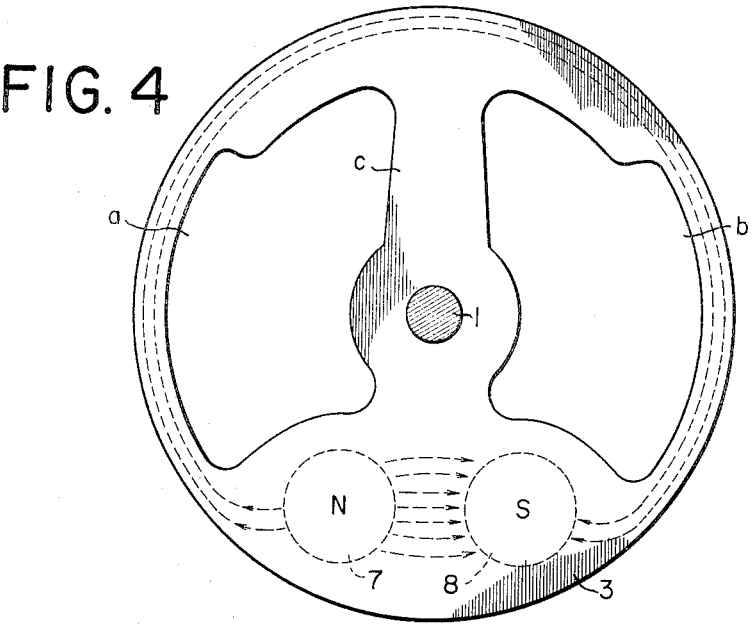
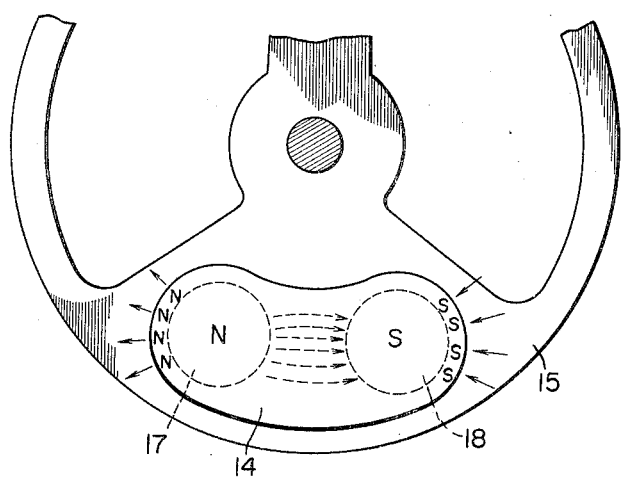

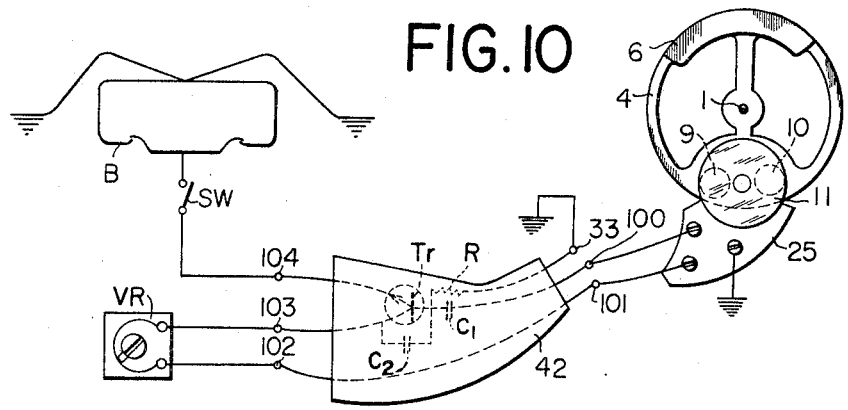
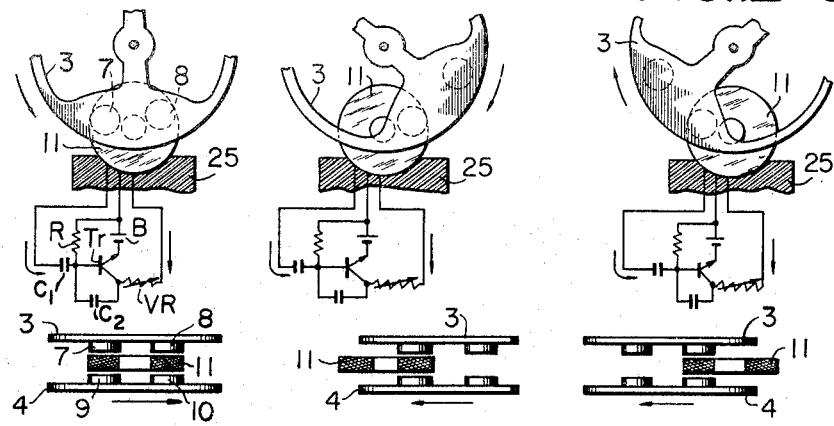
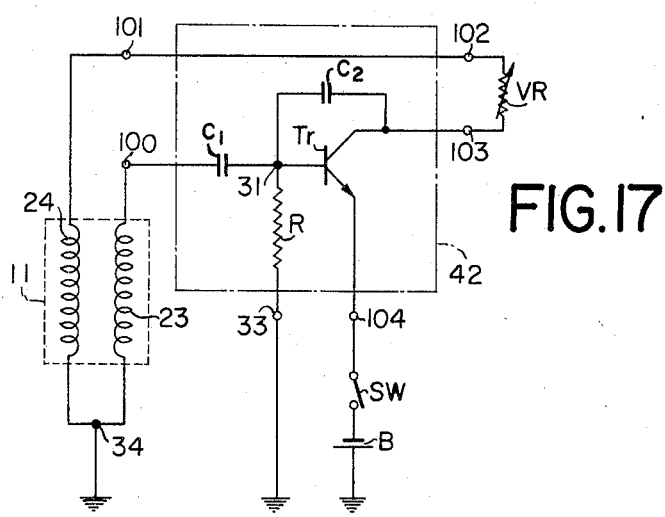

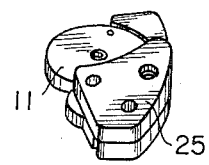
FIG. 14
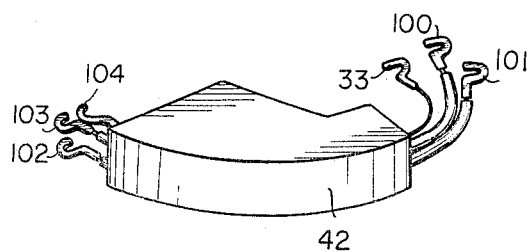
FIG. 15
FIG. 16
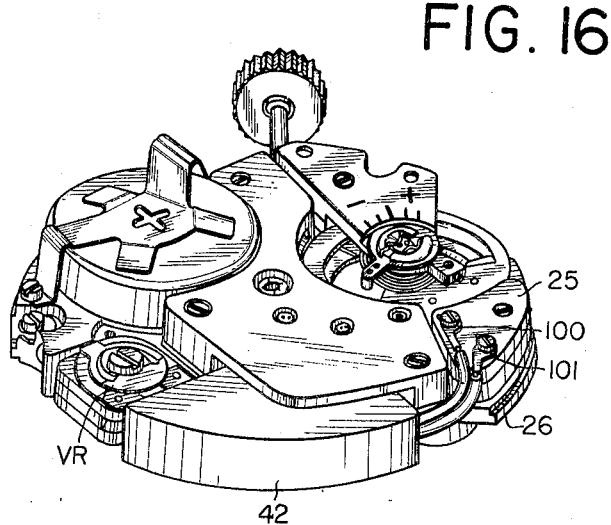

United States Patent Office 3,487,629
Patented Jan. 6, 1970

3,487,629
DRIVE BALANCE WHEEL ARRANGEMENT
FOR TIMEPIECE
Hirotoki Takamune, Goro Hanaue, Yoshifumi Mochizuki,
Fujio Ishida, Kazuyoshi Inoki, and Yasuaki Nakayama,
Tokyo, Japan, assignors to Citizen Tokei Kabushiki
Kaisha
Filed Feb. 18, 1966, Ser. No. 528,614
Claims priority, application Japan, Feb. 22, 1965,
40/10,271; Mar. 1, 1965, 40/16,355; Mar. 31,
1965, 40/24,800
Int. Cl. G04c 3/04
U.S. Cl. 58—28                              3 Claims

ABSTRACT OF THE DISCLOSURE

A drive balance wheel arrangement for a timepiece wherein a pair of identical balance wheels are mounted in parallel spaced apart relation for common oscillation about a common axis. A pair of magnets are mounted adjacent the rim of each wheel in close proximity to each other on opposing faces of said wheel. A magnet of each pair is aligned with a respective magnet of the other pair with a gap therebetween for the reception of a fixed coil assembly.

---

The present invention relates to a drive balance-wheel arrangement for an electric timepiece, comprising therein a plurality of oscillatory permanent magnets and a stationary sensing or searching and driving coil assembly for cooperating therewith and fed with currents from a transistor driver circuit.

An object of the present invention is to provide a drive balance-wheel arrangement for minimizing otherwise possible stray flux losses.

Another object is to provide an arrangement of the above kind, capable of working with a more accurate stepping accuracy than that obtaintable by a comparative conventional arrangement.

Still another object is to provide an arrangement of the above kind, capable of obviating adverse magnetic influences upon the hair-spring fitted conventionally to the balance-wheel.

A further object is to provied an arrangement of the above kind, having a smaller overall height and thus being highly adapted for use as being incorporated in a portable electric watch.

Still another object is to provide an arrangement of the above kind, which is fitted with a coil assembly highly durable against external physical forces and highly convenient to assemble with the movement of a timepiece.

A further object of the present invention is to provide a balance-wheel arrangement with electronic drive means, wherein the latter is made in a compacted form so as to provide superior easiness in handling.

Another object of the present invention is to provide a balance-wheel assembly with electronic drive means, wherein the latter is adjustable so as to regulate the oscillating stroke of the balance-wheel in a highly easy and convenient manner.

A further object of the present invention is to provide a drive balance-wheel arrangement which requires a minimum possible power consumption and provides least possible position error in the course of its operation fitted in a small timepiece such as portable electric watch.

Other objects, features and advantages of the invention will be apparent from the following detailed description when read with the drawings which show, by way of example, substantially a preferred embodiment of the invention.

In the drawings:

FIG. 3 is a schematic explanatory view of the balance-wheel proper, showing a magnetic circuit formed therein, when seen in a vertical plane;

FIG. 4 is a schematic and partially sectioned top plan view of the balance-wheel, showing a magnetic circuit formed in the material of the wheel, when seen in a horizontal plane;

FIG. 5 is a similar view to FIG. 4, showing the magnetic passage of a comparative conventional balance-wheel;

FIG. 10 is a schematic explanatory view of the whole arrangement in combination with an electronic driver;

Figure 13:
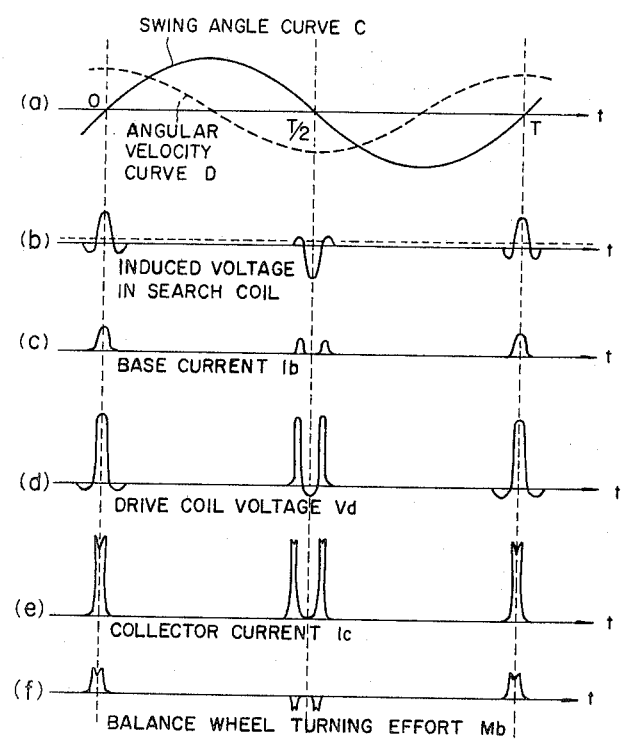

FIGS. 12–A, 12–B and 12–C are explanatory schematic views, illustrating several operating steps of the balance-wheel;

FIG. 13 is a series of explanatory diagrams, for illustrating the working modes of the balance-wheel arrangement according to the invention;

FIG. 14 is a perspective view of the balance-wheel in combination with its cooperative coil assembly;

FIG. 15 is a perspective view of the electronic driver shown in its completed, compacted form;

FIG. 16 is a perspective view of a timepiece movement fitted with the balance-wheel arrangement; and FIG. 17 is a modified driver circuit adapted for cooperation with the drive balance-wheel assembly according to the invention.

Now referring to the accompanying drawings, especially FIGS. 1–4 thereof, a preferred embodiment of an electromagnetic drive balance-wheel embodying several features of the present invention will be described more in detail.

A balance-wheel shaft 1 is rotatably mounted and loaded conventionally with a hair-spring 2 and attached fixedly with a pair of circular plates or wheel discs 3 and 4, each having a pair of large openings a and b, respectively, formed at both sides of arm c of the respective disc. As clearly seen in FIG. 1, the discs 3 and 4 are arranged in a physically parallel relation to each other. On the upper wheel disc 3, there is fixedly mounted a pair of depending permanent magnets 7 and 8, preferably shaped as shown in rigid circular cylinders. In the similar, yet opposing way, a further pair of magnets 9 and 10 are fixedly attached on the inside or upper surface of the lower wheel disc 4, in such a way that the magnet couple 7, 9 or 8, 10 is arranged in a magnetically opposing relation to each other, as clearly understood by a plurality of symbols N and S, showing conventionally the polarities of these permanent magnets. In this way, the discs 3–4 constitute in combination a yoke of the magnet arrangement.

In addition, these discs are made of a magnetically permeable material such as for instance, steel, soft iron or the like, for establishing magnetic passages, as will be described more fully hereinbelow.

A magnetic circuit thus formed is clearly illustrated by a number of small arrows and a plurality of dotted lines in FIG. 3, with the points of these arrows representing the general direction of the magnetic fluxes flowing through the circuit. A stationary coil assembly 11 comprising a conventional sensing or search coil element and a drive coil element wound in an overlapped manner or in a concentric manner, as the case may be, is arranged so as to pass through two air gaps $d$ and $e$ formed in the said magnetic circuit, as seen from FIGS. 1 and 3.

Figure 8:
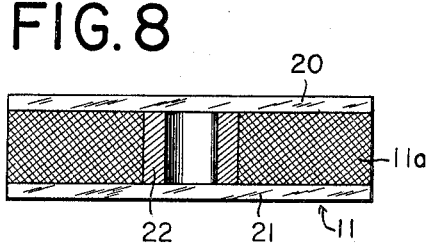
FIG. 8 is a schematic and axially sectional view of the coil assembly to cooperate with the magnet-carrying balance-wheel.

In order to maintain this relative position, the assembly is supported by a mount 25 which is in turn fixedly supported on the framework 26 of a timepiece movement, as will be seen most clearly from FIGS. 14 and 16. The coil assembly 11 is shown only by its outline configuration in FIGS. 1 and 2, and will be further described more in detail hereinafter with reference to FIG. 8. In FIG. 2, the neutral position of the balance-wheel relative to the coil assembly is shown, while the relative extreme positions of the permanent magnets relative to the latter are shown in the same drawing by chain lines. In this connection, reference should be had also to FIGS. 12–A, –B and –C.

The coil assembly is drivingly connected with an electronic driver circuit as will be described further in detail hereinafter with reference to FIGS. 9, 10, 12A–C and 17.

The wheel discs 3 and 4 are provided with counterweights 5 and 6 preferably in the form of arc-shaped bars as shown, respectively, fixedly mounted on the respective rims of the wheel discs and in a diametrically opposite relation to each of the magnet couples. In this way, the dynamic balance of the wheel assembly may be practically attained.

In FIG. 4, the wheel disc proper at 3 is shown as a representative of the both wheel discs and mainly for the illustration of the magnetic circuit formed therein. Since the disc proper is wholly made of a magnetizable material such as pure iron, Permendur or the like, a substantial part of the magnetic fluxes emanating from one of the both permanent magnets, as at 7, carried on the wheel, will flow through the shortest passage possible to the remaining one, as at 8, as illustrated by a plurality of dotted small arrows, while a part of the fluxes will pass through a circuit formed along the peripheral rim of the disc as illustrated in the same figure by several elongated curved arrows equally shown by dotted lines. It will thus be well understood that magnetic circuits connecting the both magnets 7 and 8 in various ways are all contained in the magnetizable material of the disc proper acting as a yoke, thus no appreciable stray fluxes are dissipated from the balance-wheel. The other wheel disc 4 is designed and constructed in the same manner as above so that no further descripition thereof is necessary.

In FIG. 5, there is shown a comparative conventional balance-wheel which is, instead of making the whole body of the wheel disc proper magnetizable, provided with a small yoke 14 made of a magnetizable material similar to that set forth hereinabove and having a surface area large enough to cover a magnet couple 17–18 similar to that denoted by 7–8. This yoke was preferably cast in an opening in the material of the wheel disc proper which was, in this case, made of a non-magnetizable material such as brass and denoted by numeral 15. Instead of being cast, the yoke could be made into a thin sheet and stuck onto the surface of the disc for carrying the magnet couple fixedly thereon, for instance by means of sticking agent, screw pieces or like conventional fixing means. With such an arrangement, however, it has been found that each of the end extremities of the yoke constitutes in effect a magnetic pole such as denoted by N or S in the figure, and stray fluxes will emanate therefrom in the surrounding air and thus highly disdavantageous effects will be produced thereby against the desired optimum function of the balance-wheel. Representative prior art of the above kind was revealed in its principle in U.S. patent specification No. 3,161,012.

Wtih the present novel balance-wheel, the wheel disc proper is made wholly of magnetizable material as referred to above and thus the yoke will define no end extremities and the substantial part of the whole magnetic circuits is constituted by magnetic passages defined and maintained in the magnetizable material of the balance-wheel, with minor exception of air gaps $d$ and $e$ formed between the opposing end surfaces of the upper and lower magnets such as 7 and 9 or 8 and 10. No magnetic poles can be formed and thus stray fluxes can be substantially suppressed, whereby adverse magnetic effects upon the hair-spring 1, otherwise caused to take place by stray fluxes and earth magnetism can substantially be obviated. This means a considerable improvement in the isochronous oscillative operation of the balance-wheel.

As is commonly known, the small size magnetic coil assembly adapted for use in a small timepiece, such as an electromagnetically driven watch movement is normally of the reelless type which means that a search coil and a drive coil are wound around a ring core pinched between a pair of jigs, one being stationary and the other being movably arranged, thus the wound-up coil assembly is not provided with outer reel discs.

This type of coil assembly is however liable to be damaged when subjected to external physical forces which are freqeuntly encountered during the manufacturing process or in the course of assembling to the watch movement, although the coiled wire conductors are coated with an insulating and protecting substance such as resin base lacquer. When handling or assembling this type of conventional coils, considerable troubles such as distorsion or even collapse of the specific and accurate configuration of the coil and even breakage of the fine wire conductor have been frequently encountered. The coil assembly 11 employed in the present arrangement is however fitted on each of its end surfaces with protecting non-magnetic thin layers, preferably made of polyester, nylon or the like, as at 20 or 21 shown in FIG. 8. The coil proper 11a is wound around a ring core 22 and comprises a search coil 23 and a drive coil 24 (see, FIG. 9), although not specifically shown in FIG. 8 for clarity of the drawing. The most advantageous way for preparing this coil assembly, 5.8 mm. O.D, 1 mm. I.D and 0.6 mm. thick by way of example, is to wind two insulated wire conductors, each $12\mu$ thick, 30 m. long, into a common spool. Protecting layers 20 and 21 may amount to each $7\mu$ thick. Each of the both coil elements may have 2803 turns.

Figure 7:
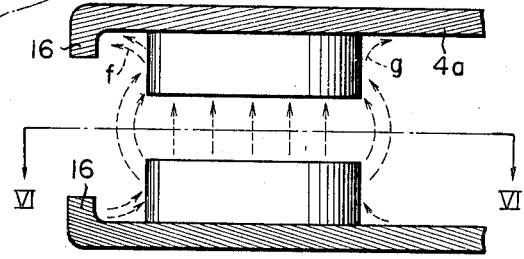
FIG. 7 is a partial elevational view thereof.
Figure 6:
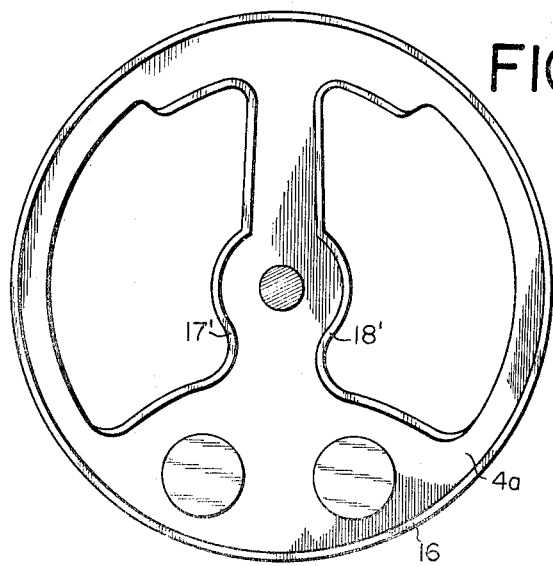
FIG. 6 is a schematic enlarged horizontal sectional view of a modified balance-wheel from that shown in FIGS. 1–4, taken on the line VI—VI in FIG. 7.

In a slightly modified wheel disc 4a shown schematically in FIG. 6, all of the outer peripheral edge at 16 as well as a substantial part of the inner peripheral edges as at 17 and 18 are turned inwardly so as to form a small flange which services for reinforcing the physical strength of the disc and for effectively reducing possible emanation of stray fluxes as easily understood by observing small dotted arrows $f$ and $g$ in FIG. 7. As noted in FIGURE 7 the magnets are spaced from the flange a distance approximately equal to the thickness of the flange. The otherwise dissipating stray fluxes may be absorbed in the material of the wheel disc. The increased physical strength will naturally invite a reduced overall dimensions of the wheel disc. If necessary, the flanged edges of the disc may form with periodical interruptions, although not shown.

Figure 9:
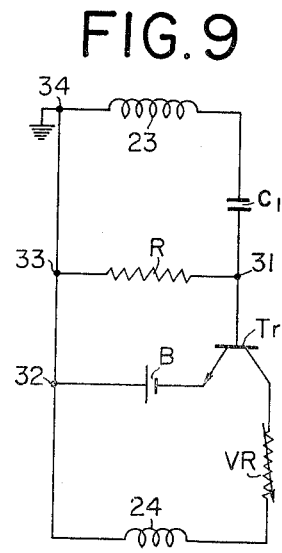
FIG. 9 is a schematic circuit diagram of an electronic driver employable in this invention.

A preferred embodiment of the electronic driver adapted for cooperation with the aforementioned balance-wheel arrangement for driving the latter is shown schematically in FIG. 9.

The search coil at 23 is electrically connected at its one end through choking condenser $C_1$ and terminal 31 to the base electrode of transistor $Tr$ of n-p-n type, while the drive coil 24 is electrically connected through terminals 32 and 33 to another end of said search coil and resistor R is connected between said terminals 31 and 33. Terminal 32 is connected through battery B to the emitter electrode of transistor T$r$, while the collector electrode thereof is connected through variable resistor VR to drive coil 24. As commonly known, the oscillating movement of the drive balance wheel is sensed by the search coil 23 and the thus induced voltage is amplified by the transistor and then fed to the drive coil 24 for keeping the wheel in a maintained oscillation. The provision of the variable resistor VR serves for alteration of the oscillatingly stepping amplitude of the wheel.

In a somewhat modified circuit shown in FIG. 17, there is provided a second condenser $C_2$ across the transistor T$r$ for suppressing possible self-oscillation. Further, a switch SW is inserted in the battery circuit for closing or opening the electronic drive circuit as desired.

The drive balance-wheel employing the drive circuit shown in FIG. 17 is schematically illustrated in FIG. 10. In this case, transistor T$r$ and other circuit elements $C_1$, $C_2$ and R are embedded in an insulating synthetic resin mass such as polypropylene, acryonitryl resin, urea resin or similar moldable substances, thereby forming a rigid and separate unit. This unit is only schematically shown by an imaginary square block 42 in FIG. 17. In FIGS. 10, 15 and 16, the electronic driver unit 42 is shown in a more practical shape. Several more terminals 100–104 are also shown in their practical positions in these figures for better understanding of the unit 42 with other related operating parts. It will be easily understood further that this unit is fitted in the movement in an easily detachable and manipulatable manner by observation of FIGS. 11, 15 and 16. Although the details are not shown, the switch SW is so designed and arranged that it is closable by manipulating a conventional stem, for instance, by pushing it manually from its time-setting position to its regulare one. The variable resistor VR for adjusting the oscillating stroke of the balance-wheel is designed in a separate unit, as will be clearly seen from FIGS. 10, 15 and 16 for easy mounting in the framework of the movement.

The operation of the arrangement described so far is as follows:

When the balance-wheel is initially brought into an oscillatory movement by a physical external force, either intentionally or unintentionally applied thereto from its neutral position schematically illustrated in FIG. 12–A to one extreme stroke position shown in FIG. 12–B, and thence in the reverse order through the neutral position to the opposite stroke extremity illustrated in FIG. 12–C under the influence of hair-spring 2. The angular stroke being preferably selected to 270°, the wheel assembly will describe graphically a sinusoidal curve "SWING ANGLE CURVE C" shown in graph (a) of FIG. 13, this curve being also plotted against time period. In correspondence thereto, the balance-wheel will show a cosine wave curve "ANGULAR VELOCITY CURVE D" plotted in the same chart (a), wherein "T" being the period of the oscillatory movement. On account of the magnetic cross-linkage thus caused between the two opposing pairs of moving permanent magnets 7, 9 and 8, 10 with stationary search and drive coils 23 and 24, united into one assembly 11 as was already referred to, voltage pulses are induced in the former coil, as shown in the second chart (b). Thus, current pulses "I$b$, see chart (c), will be fed from the search coil 23 to the base electrode of transistor T$r$, from which correspondingly amplified collector current "I$c$," see chart (e), will be delivered to drive coil 24 which is thus energized by voltage pulses "V$d$" as illustrated in chart (d). In this way, the balance-wheel is driven with turning efforts as illustrated by pulses "M$b$" in the last chart (f), thus maintaining the desired oscillatory angular movement of the balance-wheel.

Although in the foregoing embodiments, fixed resistor R is provided, it may be dispensed with when necessary. In this case, the variable resistor VR will take the duty of the fixed resistor.

When the sizes of the balance-wheel proper are selected to be similar to those which are commonly employed in conventional mechanical timepiece movements, the frequency of the balance-wheel may be designed to 2.5 vibrations per second. In this case, when employing the coil assembly 11 as was referred to hereinbefore, the circuit elements of the electronic driver may be as follows: transistor T$r$: a micro-disc type, 3.8 mm diameter, 2 mm. thick, model "NEC–2SC476" manufactured by Nippon Electric Company, Limited, 5–7, Shiba, Minato-ku, Tokyo, corresponding model "Eveready–301" sold on the market by Union Carbide Corp., 30 E. 42nd St., New York 17, N.Y., battery B: 1.5 volts 100 milliampere-hours, resistor R: about 2 megohms, variable resistor VR: 1–2 kilo-ohms, C1: 2.2 $\mu$F, C2: 0.01 $\mu$F.

With use of this circuit data, the induced voltage in the search coil 23 will be 0.5 volt and the base current I$b$ of transistor T$r$: 50 microamperes, collector current I$c$: 190 microamperes, drive coil voltage: 1.35 volts.

Figure 11:
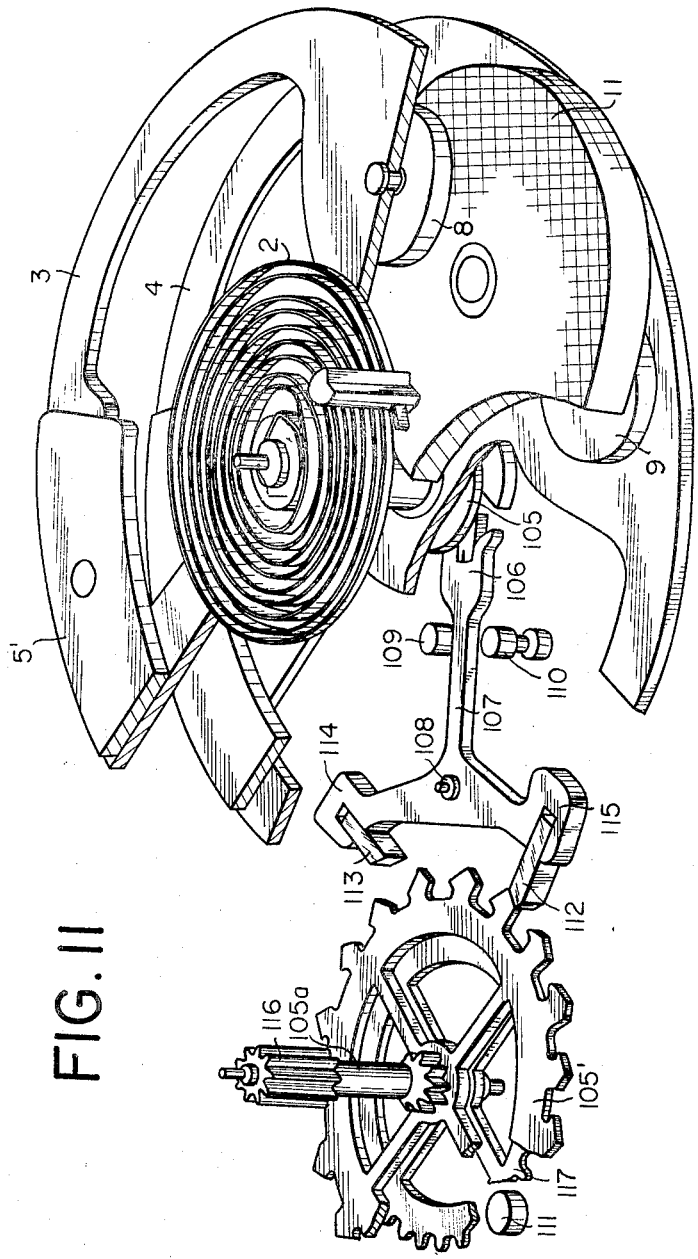
FIG. 11 is a schematic enlarged perspective view, partially broken away, of the balance-wheel arrangement, showing the operating mode thereof for driving an escape wheel of a watch.

The mode of driving connection of the aforementioned drive balance-wheel with conventional escape wheel for driving time-indicating mechanism, not shown, is illustrated in FIG. 11 by way of example.

Figure 1:
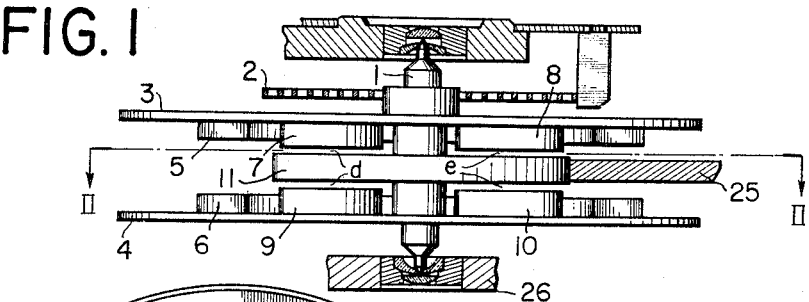
FIG. 1 is a schematic side elevational view of the balance-wheel with its conventionally attached hair-spring and several other parts shown in section.
Figure 2:
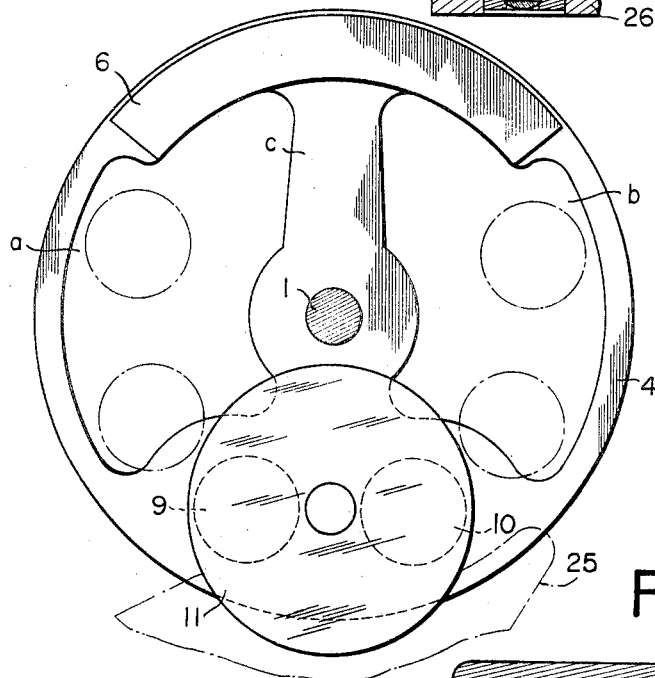
FIG. 2 is a horizontal sectional view of the balance-wheel, taken on a line II—II in FIG. 1 wherein however the coil assembly is substantially schematically shown.

Although not shown in FIG. 1 for clarity of the drawing, the balance-wheel shaft 1 is provided at its lower end with a conventional roller at 105 for cooperation with the fork at 106 of a lever 107 which is pivotable about an arbor 108 which is studded on the lower pillar plate 26 shown only in FIGS. 1 and 16. There are provided non-magnetic banking pins 109 and 110 for limiting the oscillating stroke of the lever 107 when the latter is oscillatingly driven from the balance-wheel through the roller 105 kept in cooperation with the fork 106. A pair of pallets 112–113 are fixedly mounted on arms 114–115 of the lever 107 for driving an escape wheel 105' on shaft 105$a$ which carries a pinion 116 which is kept permanently in mesh with a member of the gear train, not shown, of the timepiece movement for driving the time-indicator of the timepiece conventionally although not shown. For proper engagement of each of the pallets with the escape wheel 105', a drawing permanent magnet 111 is provided and fixedly mounted on the pillar plate just below a drawing wheel 117 which is concentrically arranged to the escape wheel 105 and connected integrally therewith.

In this case, as an alternative measure, the counter—or balance weight 5' is mounted on the top surface of upper wheel disc 3, without effecting in any appreciable manner the proper function of the balance-wheel.

What is claimed as new and desired to be secured by Letters Patent is:

1. In a drive balance wheel arrangement for use in a movement of a timepiece, comprising a balance wheel, a shaft fixedly attached thereto, said shaft being swingably mounted in said movement, a hairspring mounted between said wheel and said movement, at least a pair of permanent magnets carried on said wheel, a search and drive coil assembly mounted stationarily in said movement for cooperation electromagnetically therewith, a transistor drive circuit electrically connected with the search coil and the drive coil of said assembly, for receiving and amplifying the currents fed from said search coil and feeding the amplified currents to said drive coil, and a current source electrically connected with said circuit for feeding power thereto, said currents fed from said search coil being induced therein when said balance wheel is caused to oscillate and said currents fed to said drive coil serving for keeping the oscillation of said wheel in a continued and maintained oscillatory movement with a predetermined amplitude, said circuit comprising a transistor, at least a fixed resistor and at least a fixed condenser, said balance wheel being constructed wholly of a magnetically permeable material, said wheel being provided with cut-out portions to define flux paths through the wheel proper thereby establishing magnetic circuits passing through all of said permanent magnets and minimizing adverse magnetic effects upon said hairspring, molded resin means embedding said fixed circuit components therein in fixed relative positions, and a variable resistor positioned outside said molded means and inserted electrically in said circuit, for enabling intentional alteration of the amplitude of the oscillatory movement of said balance wheel.

2. In a drive balance wheel arrangement for use in a timepiece of the type having a fixed frame, a pair of balance wheels constructed of a magnetically permeable material fixedly mounted in spaced apart parallel relation on a shaft which is mounted for oscillatory movement in said frame and a hair spring mounted in between said frame and said shaft, the improvement comprising a pair of permanent magnets mounted on each wheel adjacent the periphery thereof on the face of the balance wheel facing the other balance wheel, the magnets of each pair of magnets being mounted in close proximity to each other and in spaced apart aligned relation with the pair of magnets on the other wheel, each balance wheel is provided with cut out portions to define a relatively narrow circular rim portion and a diametrically arranged cross bar to define flux paths through the wheel proper to establish magnetic circuits passing through said wheels and said magnets thereby minimizing adverse magnetic affects upon said hair spring, a search and drive coil assembly fixedly mounted on said frame and extending between said pairs of magnets, a transistor drive circuit electrically connected with the search coil and the drive coil of said assembly for receiving and amplifying the currents fed from said search coil and feeding the amplified currents to said drive coil, and a current source electrically connected with said circuit for feeding power thereto, said currents fed from said search coil being induced therein when said balance wheel oscillates and said current fed to said drive coil serving to keep the oscillation of said wheel in a continued oscillatory movement having a predetermined amplitude, peripheral flanges formed on each of said wheels and spaced from said magnets for absorbing substantial portions of any stray flux emanating from said permanent magnets.

3. In a drive balance wheel arrangements for use in a timepiece of the type having a fixed frame, a pair of balance wheels constructed of a magnetically permeable material fixedly mounted in spaced apart parallel relation on a shaft which is mounted for oscillatory movement in said frame and a hair spring mounted in between said frame and said shaft, the improvement comprising a pair of permanent magnets mounted on each wheel adjacent the periphery thereof on the face of the balance wheel facing the other balance wheel, the magnets of each pair of magnets being mounted in close proximity to each other and in spaced apart aligned relation with the pair of magnets on the other wheel, each balance wheel is provided with a cut out portion to define a relatively narrow circular rim portion and a diametrically arranged cross bar to define flux paths through the wheel proper to establish magnetic circuits passing through said wheels and said magnets thereby minimizing adverse magnetic affects upon said hair spring, a search and drive coil assembly fixedly mounted on said frame and extending between said pairs of magnets, a transistor drive circuit electrically connected with the search coil and the drive coil of said assembly for receiving and amplifying the currents fed from said search coil and feeding the amplified currents to said drive coil, and a current source electrically connected with said circuit for feeding power thereto, said currents fed from said search coil being induced therein when said balance wheel oscillates and said current fed to said drive coil serving to keep the oscillation of said wheel in a continued oscillatory movement having a predetermined amplitude, peripheral flanges formed on each of said wheels for absorbing substantial portions of any stray flux emanating from said permanent magnets, said circuit comprising a transistor, at least a fixed resistor, and at least a condensor, resin means embedding said circuit components and forming as small, compact, unitary, molded module for easily assembly and a variable resistor located outside said molded module and electrically inserted into said circuit.

References Cited

UNITED STATES PATENTS

| | | | |
|---|---|---|---|
| 3,049,801 | 8/1962 | Jensen | 58—23 |
| 3,156,857 | 11/1964 | Herr et al. | |

FOREIGN PATENTS 1,376,358  9/1964  France.

RICHARD B. WILKINSON, Primary Examiner

EDITH C. SIMMONS, Acsistant Examiner

U.S. Cl. X.R.

318—132